United States Patent
Yun et al.

(10) Patent No.: US 11,064,156 B2
(45) Date of Patent: Jul. 13, 2021

(54) CAMERA CONTROL METHOD, CAMERA, AND SURVEILLANCE SYSTEM

(71) Applicant: HANWHA TECHWIN CO., LTD., Seongnam-si (KR)

(72) Inventors: Sang Jin Yun, Changwon-si (KR); Hyuck Rae Kim, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 1325 days.

(21) Appl. No.: 14/279,435

(22) Filed: May 16, 2014

(65) Prior Publication Data
US 2015/0201164 A1    Jul. 16, 2015

(30) Foreign Application Priority Data
Jan. 13, 2014   (KR) ........................ 10-2014-0004048

(51) Int. Cl.
*H04N 7/18*      (2006.01)
*H04N 5/232*     (2006.01)

(52) U.S. Cl.
CPC ......... *H04N 7/181* (2013.01); *H04N 5/23206* (2013.01)

(58) Field of Classification Search
CPC ...... H04N 7/18; H04N 7/181; H04N 5/23206; G08B 13/196
(Continued)

(56) References Cited

U.S. PATENT DOCUMENTS

2006/0199734 A1*  9/2006  Yamashita ......... H04N 1/00204
                                                  503/227
2009/0027509 A1*  1/2009  Giesen .................. H04N 5/232
                                                  348/211.3
(Continued)

FOREIGN PATENT DOCUMENTS

CN    101217483 A    7/2008
CN    101764835 A    6/2010
(Continued)

OTHER PUBLICATIONS

Qin Lu; "Research on Multi-Node Cooperative Image Acquisition and Compression Technology in Wireless Multimedia Sensor Networks", Chinese Doctoral Dissertations Full-text Database Information Science and Technology, Feb. 15, 2011; Paragraph 1 on p. 3, pp. 11-12, the last paragraph on p. 72 to paragraph 1 on p. 73, Relevant to Claims 1-20.
(Continued)

*Primary Examiner* — Joseph G Ustaris
*Assistant Examiner* — Jimmy S Lee
(74) *Attorney, Agent, or Firm* — McLean IP Global; Jason Y. Pahng

(57) ABSTRACT

A method of controlling a plurality of cameras in a communication network is provided. The method includes: controlling a camera to receive and analyze information about an idle time of each of at least one other camera; according to the analyzing, controlling the camera to transmit at least one task and/or information about the at least one task to the at least one other camera, wherein the idle time of each of the at least one other camera is set to a time remaining before each of the at least one other camera is configured to execute a task among one or more tasks or a sum of time durations at which no tasks are allocated to each of the at least one other camera.

22 Claims, 12 Drawing Sheets

(58) Field of Classification Search
USPC .......................................... 348/61, 143, 159
See application file for complete search history.

(56) References Cited

U.S. PATENT DOCUMENTS

| | | | | |
|---|---|---|---|---|
| 2010/0046640 | A1* | 2/2010 | Shin | H04N 19/105 375/240.29 |
| 2011/0273567 | A1* | 11/2011 | Bhan | H04N 7/181 348/159 |
| 2011/0286631 | A1* | 11/2011 | Wagner | G06K 9/32 382/103 |
| 2013/0208124 | A1* | 8/2013 | Boghossian | H04N 7/181 348/159 |
| 2013/0250120 | A1* | 9/2013 | Ooi | H04N 7/181 348/159 |
| 2015/0097919 | A1* | 4/2015 | Karimi-Cherkandi | H04L 65/80 348/14.07 |

FOREIGN PATENT DOCUMENTS

| | | |
|---|---|---|
| JP | 2004-88156 A | 3/2004 |
| JP | 2012-004720 A | 1/2012 |
| KR | 2000-0045488 A | 7/2000 |
| KR | 10-2011-0011070 A | 2/2011 |
| KR | 10-2011-0044110 A | 4/2011 |
| KR | 10-2013-0071510 A | 7/2013 |

OTHER PUBLICATIONS

The First Chinese Office Action dated Sep. 30, 2018; Appln. No. 201410363110.4.

\* cited by examiner

FIG. 10

| CAMERA CLASSIFICATION | LOCATION | IMAGE ANALYSIS OBJECT | 우선 순위 |
|---|---|---|---|
| 1ST CAMERA | LOBBY | FACE DETECTION, MOTION DETECTION, LINE-CROSSING DETECTION | ➡ 1 |
| 2ND CAMERA | STAIRS | MOTION DETECTION | ➡ 3 |
| 3RD CAMERA | OFFICE | - | ➡ 4 |
| 4TH CAMERA | STORE | TAMPERING DETECTION MOTION DETECTION | ➡ 2 | great # CAMERA CONTROL METHOD, CAMERA, AND SURVEILLANCE SYSTEM

CROSS-REFERENCE TO RELATED APPLICATION

This application claims priority from Korean Patent Application No. 10-2014-0004048, filed on Jan. 13, 2014, in the Korean Intellectual Property Office, the disclosure of which is incorporated herein in its entirety by reference.

BACKGROUND

1. Field

Methods and apparatuses consistent with exemplary embodiments relate to controlling a plurality of cameras in a surveillance system.

2. Description of the Related Art

In a surveillance system in which cameras and client terminals are connected to one another through a communication network, cameras communicate with the client terminals, and also with the other cameras in a peer to peer (P2P) method.

However, according to related art methods, cameras perform operations relying only on the client terminals. That is, while cameras individually operate respective functions in communication with the client terminals, the cameras do not communicate with one another.

Accordingly, a mutual communication function between the cameras is not used.

Also, each camera has different execution waiting tasks and a different operation speed according to different hardware usage states. Here, examples of hardware usage states may be a usage ratio of a central processing unit (CPU), a usage ratio of a random access memory (RAM), and a usage ratio of a communication network.

Accordingly, from the viewpoint of the cameras as a whole, it is not an efficient operation.

SUMMARY

One or more exemplary embodiments of the inventive concept provide a camera which enables an efficient operation from the viewpoint of cameras as a whole, by using a mutual communication function of cameras in a system in which the cameras are connected to one another through a communication network, for example, in a surveillance system, and a method of controlling the camera.

Various aspects will be set forth in part in the description which follows and, in part, will be apparent from the description, or may be learned by practice of the exemplary embodiments.

According to an aspect of an exemplary embodiment, there is provided a method of controlling a camera which is connected to at least one other camera and at least one client terminal through a communication network. The method may include: controlling the camera to receive and analyze information about an idle time of each of the at least one other camera; according to the analyzing, controlling the camera to transmit at least one task of the camera and/or information about the at least one task of the camera to the at least one other camera, wherein the idle time of each of the at least one other camera is set to a time remaining before each of the at least one other camera is configured to execute a task among one or more tasks of each of the at least one other camera or a sum of time durations at which no tasks are allocated to each of the at least one other camera.

The method may further include controlling the camera to transmit information about an idle time of the camera to the at least other camera; and if at least one task of the at least one other camera and/or information about the at least one task of the at least one other camera are received, controlling the camera to execute the received at least one task at the camera, wherein the idle time of the camera is set to a time remaining before the camera is configured to execute a task among one or more tasks of the camera or a sum of time durations at which no tasks are allocated to the camera.

The camera may be controlled to receive the information about the idle time of each of the at least one camera at an interval of a predetermined time and/or transmit the information about the idle time of the camera at the interval of the predetermined time.

The idle time of each of the at least one camera may be calculated by adding time durations for executing all tasks set to be executed within the predetermined time and subtracting a result of the addition from the predetermined time.

The method may further include controlling the camera to determine if an idle time of the camera exists, wherein if it is determined that the idle time of the camera does not exist, the camera is controlled to transmit the at least one task of the camera to the at least one other camera.

If it is determined that the idle time of the camera does not exist, the camera may be further controlled to: obtain an estimate of an execution time required for executing the at least one task of the camera to be transmitted; transmit information on the estimate of the execution time and an execution request message to a camera having a longest idle time among the at least one other camera; if an execution-possible message from the camera having the longest idle time is received, transmit the at least one task of the camera to be transmitted to the camera having the longest idle time; if an execution-impossible message from the camera having the longest idle time is received, transmit the information on the estimate of the execution time and the execution request message to a camera having a second longest idle time; and if an execution-possible message from the camera having the second longest idle time is received, transmit the at least one task of the camera to be transmitted to the camera having the second longest idle time.

According to an aspect of another exemplary embodiment, there is provided a camera configured to be connected to at least one other camera and at least one client terminal through a communication network. The camera may include: an optical system configured to capture image data; and a communication port configured to receive information about an idle time of each of the at least one other camera; and a controller configured to analyze the information about the idle time of each of the at least one other camera, and transmit at least one task of the camera and/or information about the at least one task of the camera to the at least one other camera through the communication port, wherein the idle time of each of the at least one other camera is set to a time remaining before each of the at least one other camera is configured to execute a task among one or more tasks of each of the at least one other camera or a sum of time durations at which no tasks are allocated to each of the at least one other camera.

According to an aspect of still another exemplary embodiment, there is provided a surveillance system which may include: a plurality of cameras connected to one another; and a plurality of client terminals connected to the plurality of cameras through a communication network, wherein each of the plurality of cameras is configured to transmits an idle time of the camera to the other cameras, wherein each of the plurality of cameras is configured to receive and analyze information about an idle time of each of the other cameras, wherein, according to the analyzing, each of the plurality of cameras is configured to transmit at least one task of the camera to at least one of the other cameras, and wherein each of the plurality of cameras is configured to, if at least one task of at least one of the other cameras is received, execute the received at least one task of the at least one of the other cameras.

BRIEF DESCRIPTION OF THE DRAWINGS

These and/or other aspects will become apparent and more readily appreciated from the following description of the exemplary embodiments, taken in conjunction with the accompanying drawings, in which:

FIG. 10 is a diagram illustrating a case where priority of each of cameras shown in FIG. 5 is fixedly set by a user, according to an exemplary embodiment;

DETAILED DESCRIPTION

Descriptions and attached drawings below are for understanding of operations according to exemplary embodiments of the inventive concept, and those parts which can be easily implemented by a person skilled in the art may be omitted.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

The inventive concept will now be described more fully with reference to the accompanying drawings, in which exemplary embodiments are shown. Expressions such as "at least one of," when preceding a list of elements, modify the entire list of elements and do not modify the individual elements of the list.

Figure 1:
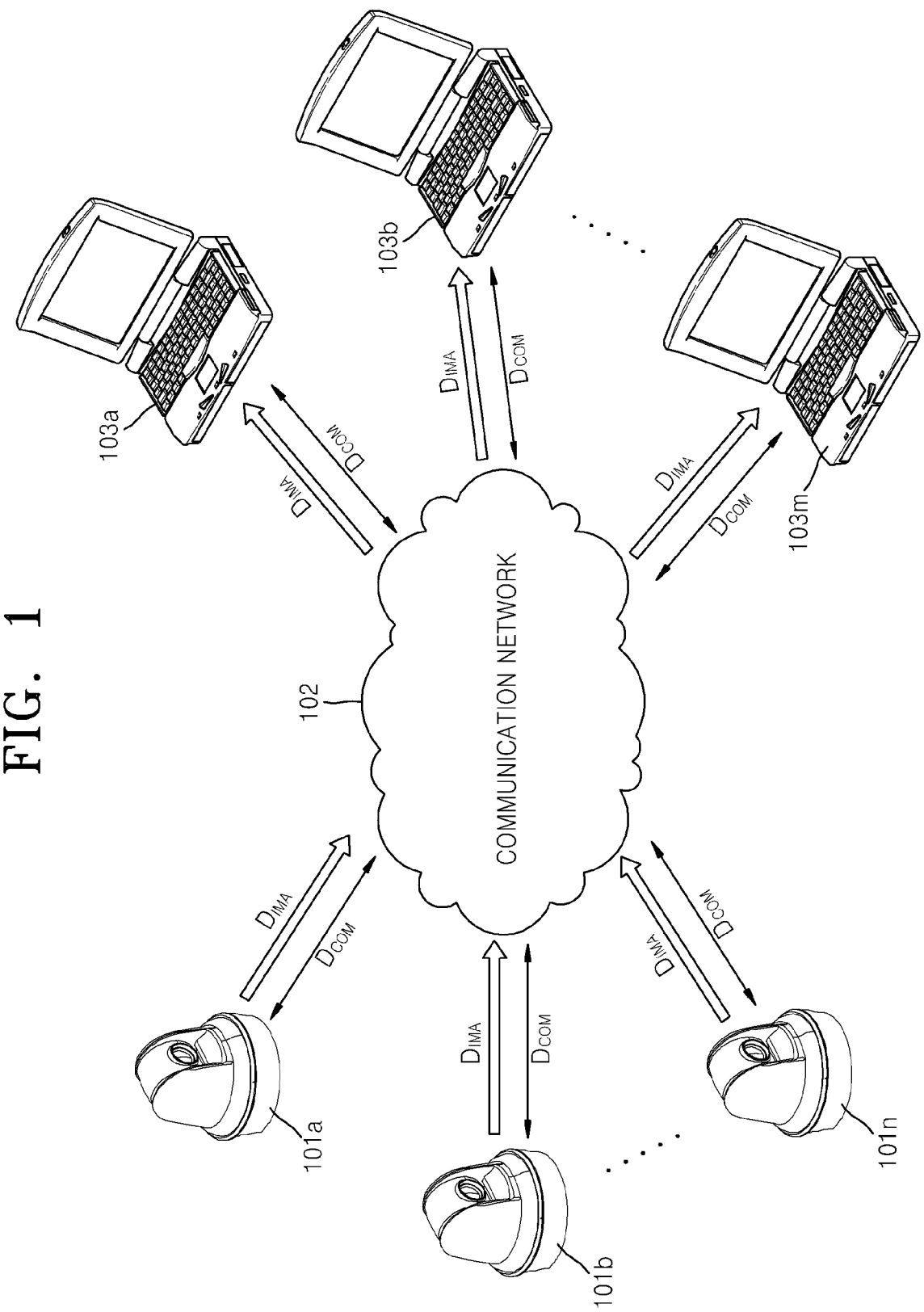
FIG. 1 is a diagram of a surveillance system according to an exemplary embodiment.

FIG. 1 is a diagram of a surveillance system according to an exemplary embodiment.

Referring to FIG. 1, cameras 101A-101N exchange communication signals $D_{COM}$ with client terminals 103A-103M, and transmit moving picture data $D_{IMA}$ of live-view to client terminals 103A-103M, through a communication network 102.

Each of the cameras 101A-101N transmits information about an idle time of the camera to the other cameras at a predetermined time interval, and receives information about an idle time of each of the other cameras at the predetermined time interval. According to the present embodiment, the idle time of the camera is set to a sum of time durations at which no tasks to execute or no execution waiting tasks are allocated to the camera in a given time. According to another exemplary embodiment, however, the idle time of the camera may be set to a time remaining before the camera is configured to execute an immediate next task or execution waiting task among a plurality of tasks.

According to an exemplary embodiment, the predetermined time interval for transmitting and receiving the idle time information of the camera to and from the other cameras may be one (1) second, and the given time mentioned above may also be one (1) second. Hereafter, the inventive concept is explained assuming that the idle time of each camera and the given time are one (1) second, and thus, the idle time is referred to as "idle-time-per-second". Detailed descriptions about the idle-time-per-second are provided later in reference to FIG. 5.

According to an exemplary embodiment, the predetermined time interval may differ by camera. That is, the predetermined time interval at which the camera 101A transmits its information about an idle time to the other cameras may be different from the predetermined time interval at which the camera 101B transmits its information about an idle time to the other cameras.

In the above, transmitting and receiving the idle time information are performed directly between the cameras 101A-101N. According to another exemplary embodiment, however, the idle time information of the cameras 101A-101N may be transmitted and received by way of a server (not shown) connected to the communication network 102 or one of the cameras 101A-101N which may function as a server.

Also, according to a result of comparing an idle-time-per-second of the camera and an idle-time-per-second of each of the other cameras, each of the cameras 101A-101N transmits at least one execution waiting task among execution waiting tasks of the camera and/or information about the at least one execution waiting task of the camera to at least one of the other cameras. If at least one execution waiting task of at least one of the other cameras and/or information about the at least one execution waiting task of the at least one of the other cameras are received, the receiving camera executes the at least one execution waiting task. Hereafter, an execution waiting task and/or information about the execution waiting task, and at least one execution waiting task and/or information about the at least one execution waiting task transmitted between the cameras 101A-101N is referred to as "an execution waiting task" and "at least one execution waiting task" for brevity of description.

According to the above camera operation method, the cameras and the surveillance system of the present embodiment, a mutual communication function of the cameras 101A-101N is used and thus, an efficient operation is enabled from the viewpoint of the cameras 101A-101N as a whole. Examples of this efficient operation are as follows.

Firstly, if at least one other camera executes at least one waiting task of a current camera, performance of the current camera can be increased. For example, the current camera may analyze high resolution live-view moving picture data and can more accurately determine whether or not an event occurs while the other camera executes the task of the current camera.

Secondly, in processing live-view moving picture data and transmitting the processed live-view moving picture data to client terminals 103A-103M, there is a case when relatively many destination client terminals are connected to a first camera. In this case, the first camera may transmit live-view moving picture data and Internet Protocol (IP) addresses of the destination client terminals to a third camera, and the third camera may transmit the received live-view moving picture data to the received IP addresses of the destination client terminals. By this efficient transmission, the transmission performance of the first camera may be increased.

Thirdly, as idle-time-per-second information of a current camera is transmitted to other cameras every second and idle-time-per-second information of each of the other cameras is received by the current camera every second, each of the cameras can monitor whether a certain camera is faulty or does not have an idle-time-per-second. For example, the current camera can provide client terminals with information of a camera which does not transmit its idle-time-per-second information every second.

This will now be explained in detail.

Figure 2:
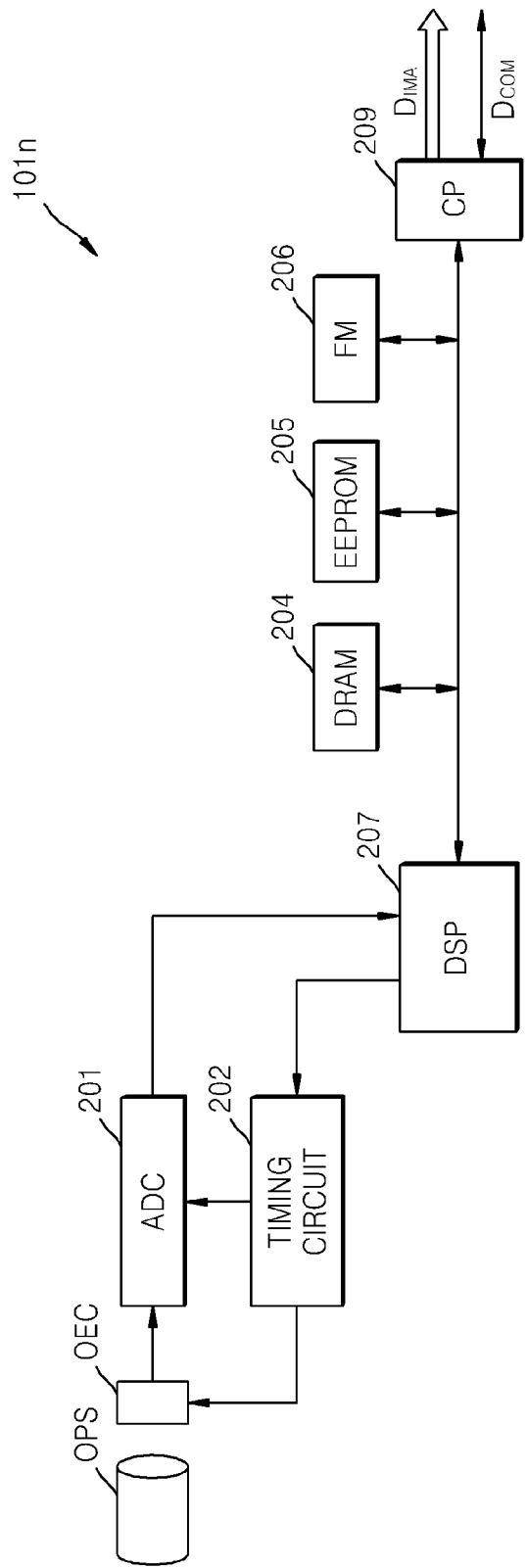
FIG. 2 is a block diagram of an internal structure of a camera shown in FIG. 1, according to an exemplary embodiment.

FIG. 2 is a block diagram of an internal structure of a camera shown in FIG. 1, according to an exemplary embodiment.

Referring to FIGS. 1 and 2, a camera 101N according to an exemplary embodiment includes an optical system (OPS), an optical-to-electrical converter (OEC), an analog-to-digital converter (ADC) 201, a timing circuit 202, a dynamic random access memory (RAM) 204, an electrically erasable and programmable read only memory 205, a flash memory 206, a digital signal processor 207 as a controller, and a communication port 209.

The optical system (OPS) including a lens unit and a filter unit optically processes light from an object.

The optical-to-electrical converter (OEC) of a charge coupled device (CCD) or a complementary metal-oxide-semiconductor (CMOS) converts the light from the optical system (OPS) to an electrical analog signal. Here, the digital signal processor 207 as a main controller controls the timing circuit 202 and thus, controls the optical-to-electrical converter (OEC) and the analog-to-digital converter (ADC) 201.

The analog-to-digital converter (ADC) 201 processes an analog image signal from the optical-to-electrical converter (OEC), and thus, removes high frequency noise and adjusts amplitude of the signal. Then, the analog-to-digital converter (ADC) 201 converts the signal into digital image data. This digital image data is input to the digital signal processor 207.

The DRAM 204 temporarily stores the digital image data from the digital signal processor 207. In the EEPROM 205, programs required for operations of the digital signal processor 207 are stored. In the flash memory (FM) 206, setting data required for operations of the digital signal processor 207 is stored.

Through the communication port 209, the digital signal processor 207 exchanges communication signals $D_{COM}$ with the client terminals 103A-103M, and transmits live-view moving picture data $D_{IMA}$ to the client terminals 103A-103M.

Here, the digital signal processor 207 transmits idle-time-per-second information of its camera to other cameras every second, and receives idle-time-per-second information from each of the other cameras.

Also, according to a result of comparing an idle-time-per-second of its camera and an idle-time-per-second of each of the other cameras, the digital signal processor 207 transmits at least one execution waiting task among executing waiting tasks of its camera to at least one of the other cameras. If the at least one execution waiting task of the at least one of the other cameras is received, the at least one execution waiting task may be executed.

The operation of the digital signal processor 207 will now be explained in detail.

Figure 3:
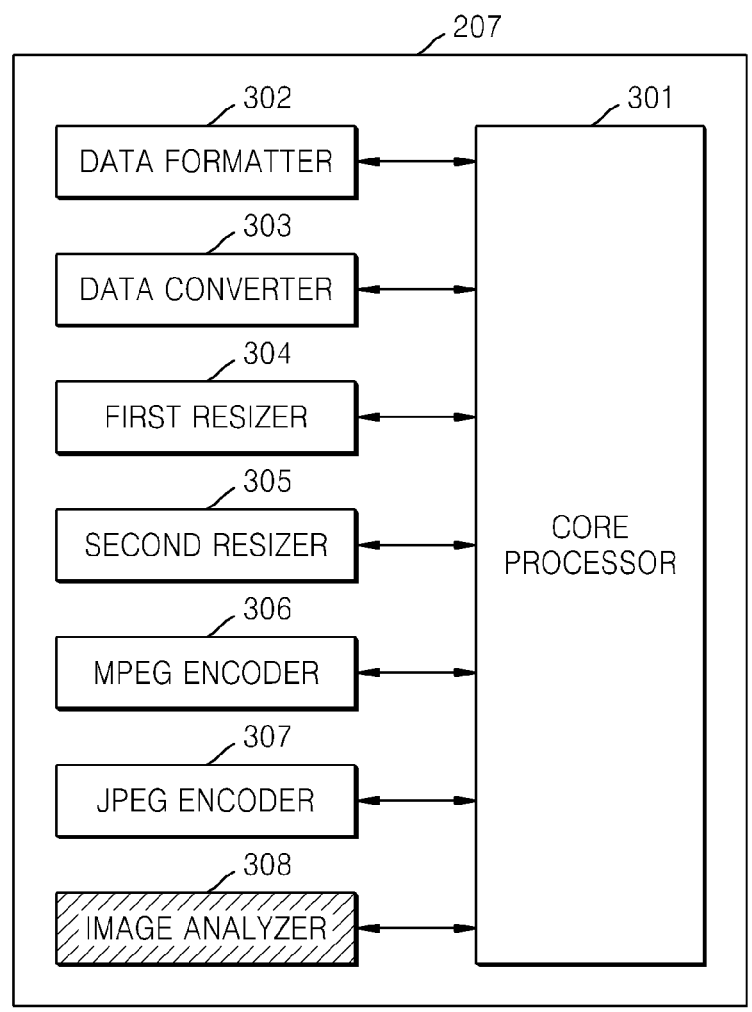
FIG. 3 is a block diagram of an internal structure of a digital signal processor shown in FIG. 2, according to an exemplary embodiment.

FIG. 3 is a block diagram of an internal structure of a digital signal processor shown 207 in FIG. 2, according to an exemplary embodiment.

Referring to FIGS. 2 and 3, the digital signal processor 207 of FIG. 2 includes a data formatter 302, a data converter 303, a first resizer 304, a second resizer 305, a Moving Picture Experts Group (MPEG) encoder 306 as a moving picture encoder, a Joint Photographic Experts Group (JPEG) encoder, an image analyzer 308, and a core processor 301. The core processor 301 controls the data formatter 302, the data converter 303, the first and second resizers 304 and 305, the MPEG encoder 306, the JPEG encoder 307, and the image analyzer 308.

The data formatter 302 arranges digital image data from the analog-to-digital converter 201 to fit a storage format of the DRAM 204.

The data converter 303 converts digital image data in the form of red (R), green (G), and blue (B) into digital image data in the form of luminance (Y) and chrominance (Cb, Cr).

A plurality of resizers 404 and 405 changes a resolution of live-view moving picture data from the analog-to-digital converter (ADC) 201.

The JPEG encoder 406 as a still image encoder compresses still image data from the analog-to-digital converter (ADC) 201.

The image analyzer 308 determines whether an event occurs, by analyzing the live-view moving picture data from the analog-to-digital converter (ADC) 201. That is, the image analyzer 308 executes execution waiting tasks to determine whether the event occurs. For example, the image analyzer 308 executes a face detection task, a motion detection task, a line-crossing detection task, and a tampering detection task.

Figure 4:
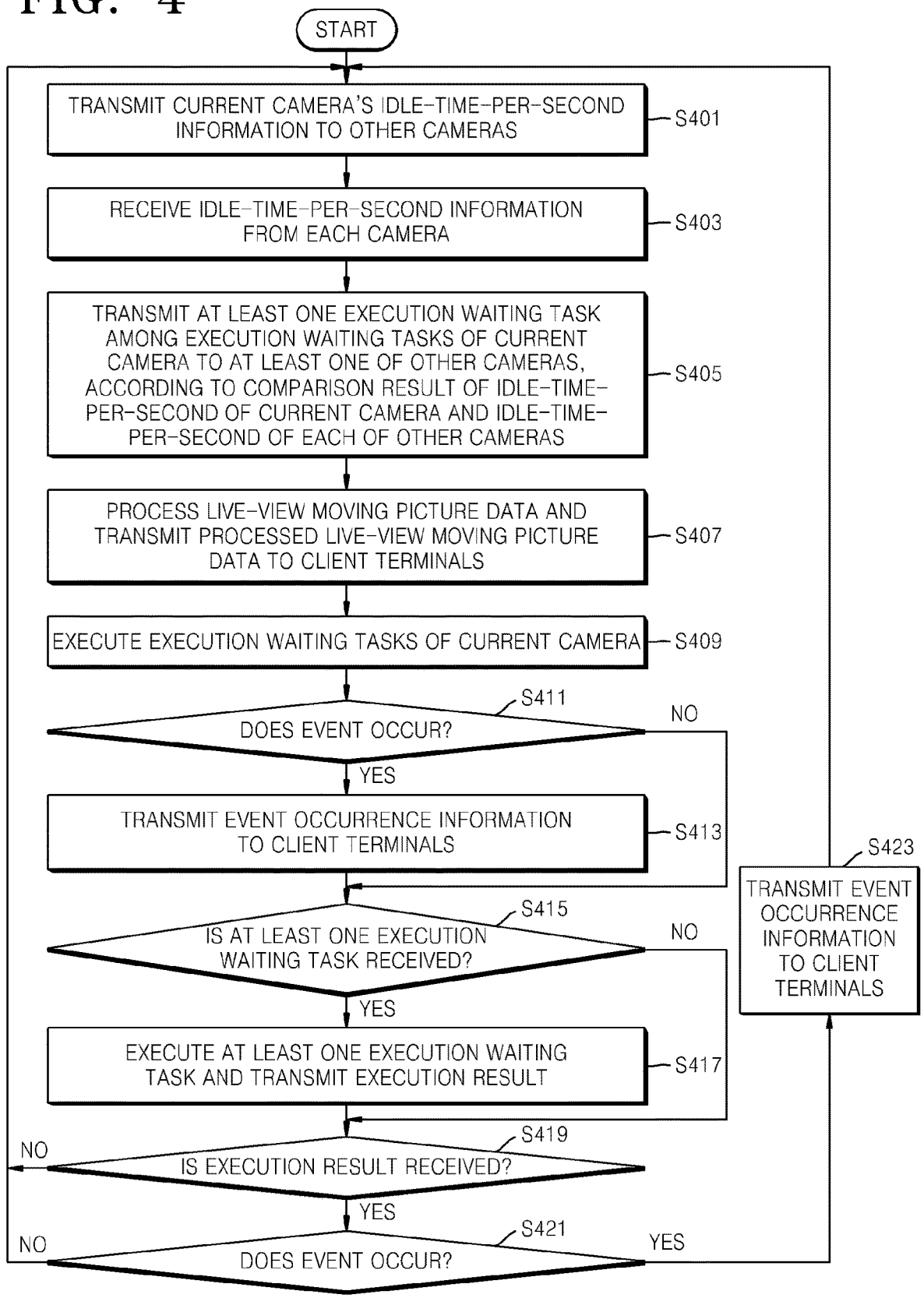
FIG. 4 is a flowchart of a main operation of a core processor shown in FIG. 3, according to an exemplary embodiment.

FIG. 4 is a flowchart of a main operation of the core processor 301 shown in FIG. 3, according to an exemplary embodiment.

Figure 5:
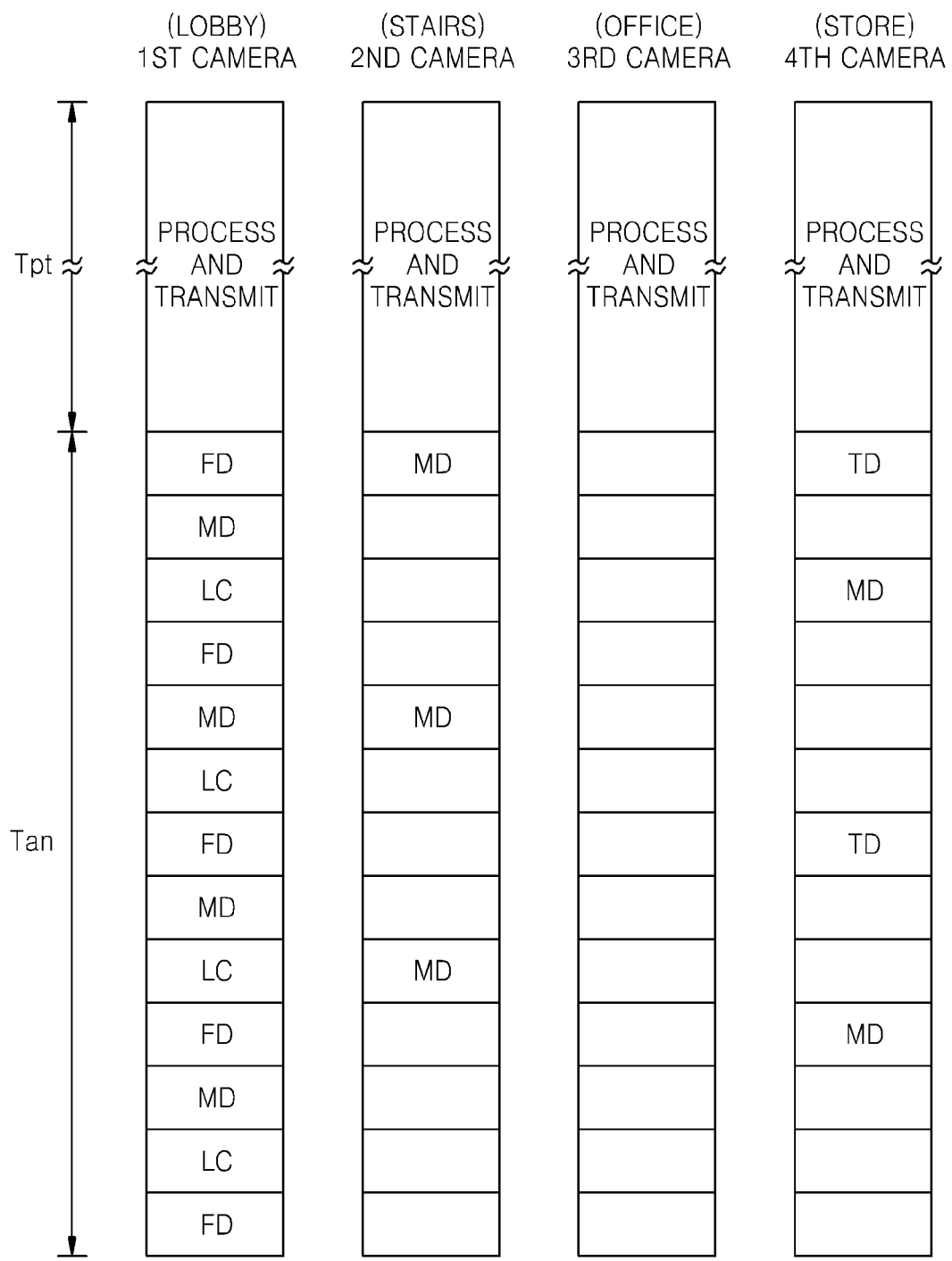
FIG. 5 is a diagram of a job queue which is generated every second, according to an exemplary embodiment.

FIG. 5 is a diagram of a job queue which is generated every second when the number of cameras in FIG. 1 is four (4), according to an exemplary embodiment.

In FIG. 5, the four (4) cameras are provided inside an identical building.

For example, a first camera is provided in a lobby where movements of people are frequent, a second camera is provided in stairs, a third camera is provided in an office, and a fourth camera is provided in a store.

In FIG. 5, a reference mark Tpt denotes a moving picture processing and transmission cycle, Tan denotes a moving picture analysis cycle, FD denotes a face detection task, MD denotes a motion detection task, LC denotes a line-crossing task, and TD denotes a tampering detection task. These execution waiting tasks include image analysis names and related image data.

In the moving picture processing and transmission cycle Tpt, the data formatter 302, the data converter 303, the first and second resizers 304 and 305, the MPEG encoder 306, and the JPEG encoder 307 operate by control from the core processor 301, and data packets obtained as processing results are transmitted to destination client terminals. In the moving picture analysis cycle Tan, the image analyzer 308 operates by control from the core processor 301. In the present embodiment, a moving picture processing and transmission cycle Tpt is 610 millisecond (ms) and a moving picture analysis cycle is 390 ms. An execution time of a unit analysis task (FD, MD, LC or TD) is 30 ms.

Referring to FIGS. 3-5, a main operation of the core processor 301 will now be explained in detail.

The core processor 301 transmits information on an idle-time-per-second of its camera, i.e., a camera in which the core processor 301 is included, to at least one other camera every second in operation S401.

An idle-time-per-second is obtained by adding a time Tpt for processing live-view moving picture data and transmitting the processed live-view moving picture data to client terminals and a time for executing all execution waiting tasks, and subtracting a result of the addition from one (1) second.

In FIG. 5, an idle-time-per-second does not exist in the first camera, and idle-time-per-seconds are 300 ms, 390 ms, and 270 ms in the second through fourth cameras, respectively.

Also, the core processor 301 receives idle-time-per-second information from each of the other cameras every second in operation S403.

Then, according to a result of comparing an idle-time-per-second of its camera and the idle-time-per-second of each of the other cameras, the core processor 301 transmits at least one execution waiting task among execution waiting tasks of its camera to at least one of the other cameras in operation S405. For example, because an idle-time-per-second of its camera does not exist, the core processor of the first camera transmits some of execution waiting tasks of its camera to the third camera having a longest idle-time-per-second.

Next, the core processor 301 processes live-view moving picture data and transmits the processed live-view moving picture data to client terminals in operation S407. Operation S407 is performed in a moving picture processing and transmission cycle Tpt.

Then, the core processor 301 executes execution waiting tasks of its camera in operation S409.

Then, if it is determined according to an execution result of execution waiting tasks, that an event occurs in operation S411, the core processor 301 transmits event occurrence information to client terminals in operation S413.

Then, if at least one execution waiting task from at least one of the other cameras is received in operation S415, the core processor 301 executes the at least one received execution waiting task, and transmits a result of the execution to the at least one camera which transmitted the execution waiting task in operation S417.

Then, the core processor 301 determines whether an execution result of an execution waiting task of its camera is transmitted to its camera from at least one of the other cameras in operation S419.

If it is determined in operation S419 that the execution result is not received, the core processor 301 repeatedly performs operation S401 and following operations.

If it is determined in the operation S419 that the execution result is received, it is determined whether event occurrence information exists in the execution result in operation S421.

If it is determined in operation S421 that event occurrence information does not exist, the core processor 301 repeatedly performs operation S401 and following operations.

If it is determined in operation S421 that event occurrence information exists, the core processor 301 transmits the event occurrence information to client terminals in operation S423 and repeatedly performs operation S401 and following operations.

Figure 6:
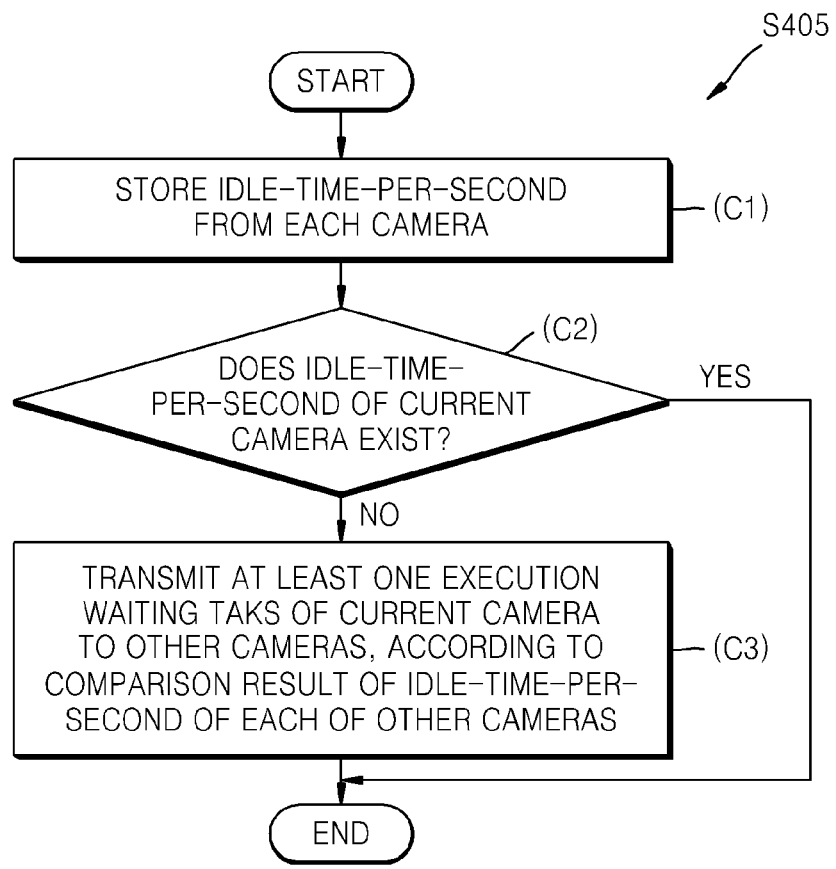
FIG. 6 is a detailed flowchart of operation S405 shown in FIG. 4, according to an exemplary embodiment.

FIG. 6 is a detailed flowchart of operation S405 shown in FIG. 4, according to an exemplary embodiment. Referring to FIGS. 3-6, operation S405 will now be explained in detail.

The core processor 301 stores information on an idle-time-per-second from each of the other cameras in operation C1.

Then, the core processor 301 determines whether an idle-time-per-second of its camera exists in operation C2.

If it is determined that an idle-time-per-second does not exist in its camera (in case of the first camera shown in FIG. 5), the core processor 301 transmits at least one execution waiting task of its camera to the other cameras, according to a comparison result of an idle-time-per-second of each of the other camera in operation C3.

Figure 7:
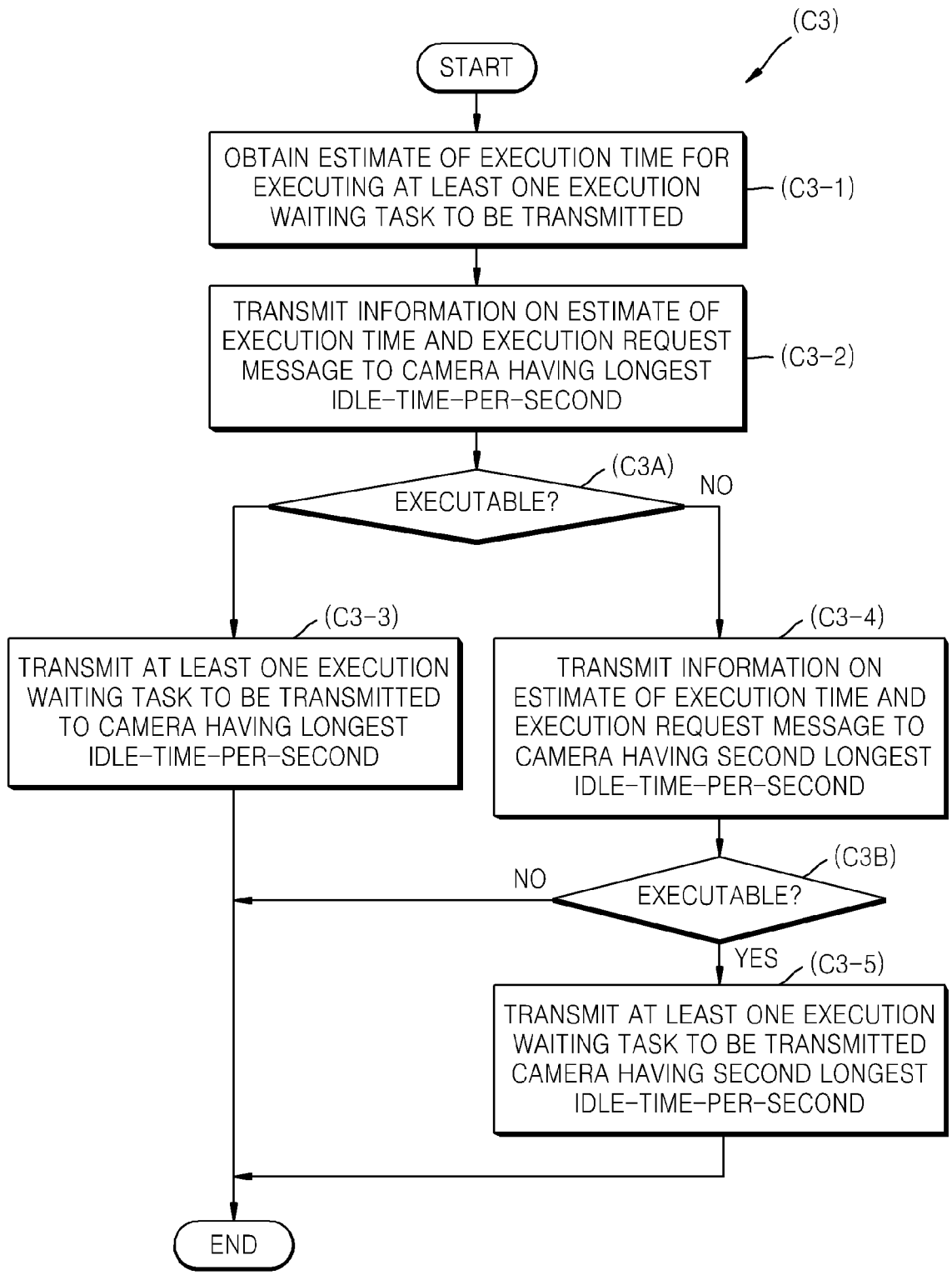
FIG. 7 is a detailed flowchart of operation C3 shown in FIG. 6, according to an exemplary embodiment.

FIG. 7 is a detailed flowchart of operation C3 shown in FIG. 6, according to an exemplary embodiment. Referring to FIGS. 3-7, operation C3 of FIG. 6 will now be explained in detail.

In operation C3-1, the core processor 301 obtains an estimate of execution time required for executing at least one execution waiting task to be transmitted. In the present embodiment, the execution time of one execution waiting task is 30 ms, and accordingly, execution time of 10 execution waiting tasks is 300 ms.

In operation C3-2, the core processor 301 transmits information on the estimate of execution time and an execution request message to a camera having a longest idle-time-per-second (the third camera in case of FIG. 5).

In operations C3A and C3-3, if an execution-possible message from the camera having a longest idle-time-per-second is received, the core processor 301 transmits the at least one execution waiting task to be transmitted, to the camera having a longest idle-time-per-second.

In the operation C3A, if an execution-impossible message from the camera having a longest idle-time-per-second is received, the core processor 301 performs operations C3-4, C3B and C3-5.

In operation C3-4, the core processor 301 transmits information about the estimate of execution time and the execution request message to a camera having a second longest idle-time-per-second (the second camera in case of FIG. 5).

In operations C3B and C3-5, if an execution-possible message from the camera having the second longest idle-time-per-second is received, the core processor 301 transmits the at least one execution waiting task to be transmitted to the camera having the second longest idle-time-per-second.

Figure 8:
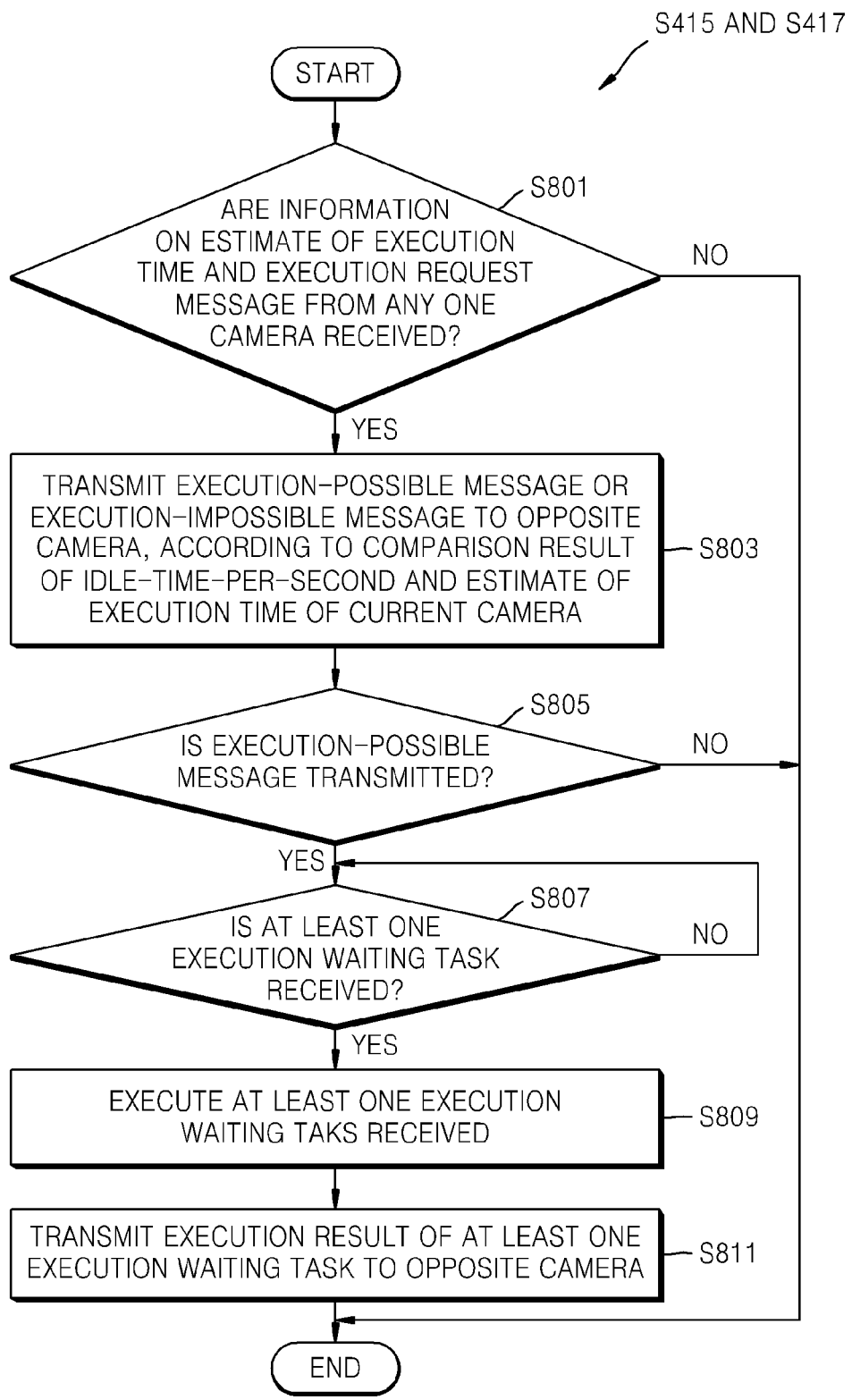
FIG. 8 is a detailed flowchart of operations S415 and S417 shown in FIG. 4, according to an exemplary embodiment.

FIG. 8 is a detailed flowchart of operations S415 and S417 shown in FIG. 4, according to an exemplary embodiment. Referring to FIGS. 5-8, operations S415 and S417 will now be explained in detail.

In operations S801 and S803, if information on an estimate of execution time for at least one execution waiting task of another camera and an execution request message from the other camera are received, the core processor 301 transmits an execution-possible message or an execution-impossible message to the other camera, according to a comparison result of an idle-time-per-second of its camera and the estimate of execution time.

In operations S805 and S809, if at least one execution waiting task from the other camera is received after the execution-possible message is transmitted, the core processor 301 executes the at least one received execution waiting task.

Then, in operation S811, the core processor 301 transmits a result of execution of the at least one execution waiting task to the other camera.

Figure 9:
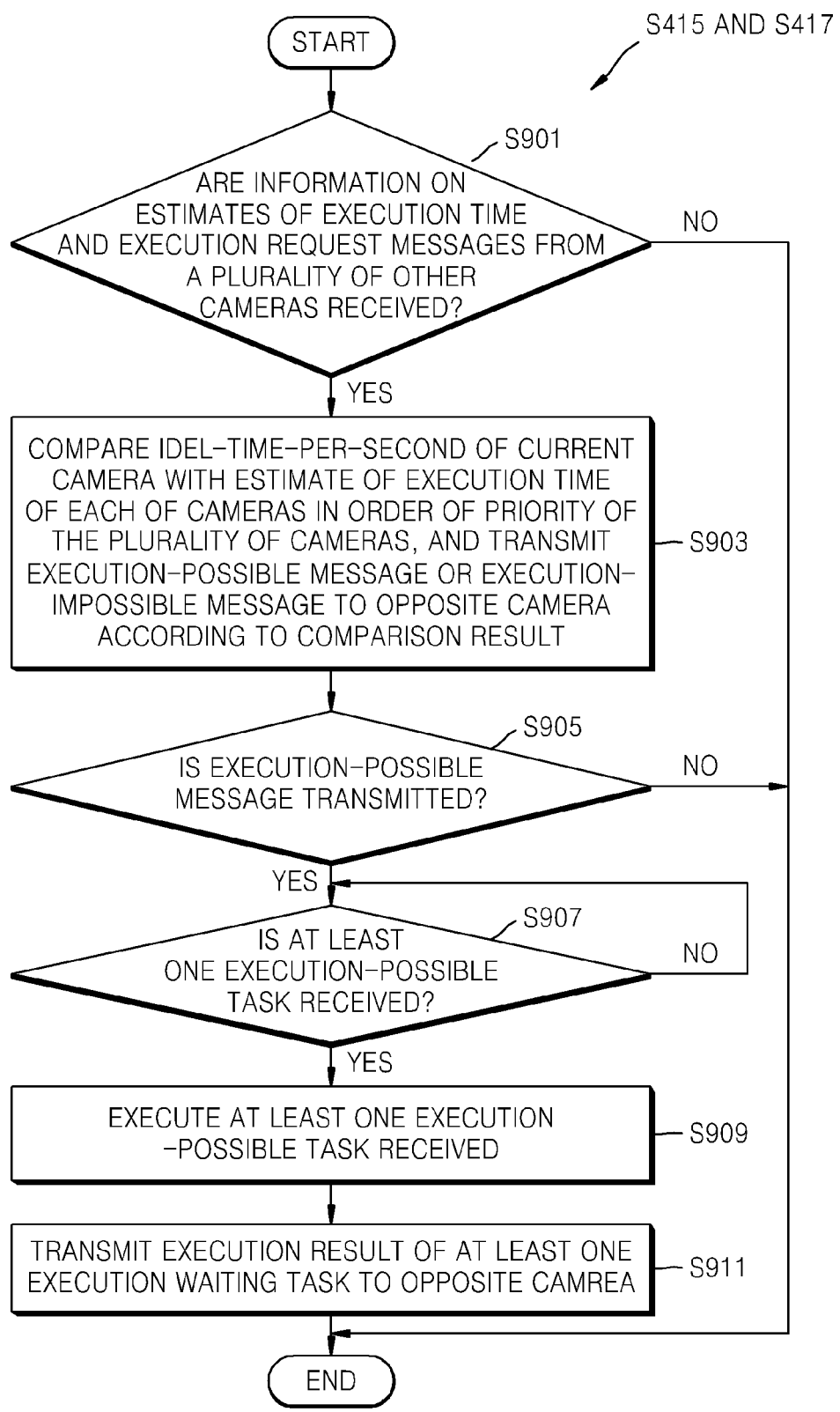
FIG. 9 is a detailed flowchart of operations S415 and S417 shown in FIG. 4, according to an exemplary embodiment.

FIG. 9 is a detailed flowchart operations S415 and S417 shown in FIG. 4, according to another exemplary embodiment. Referring to FIGS. 3-5, and 9, operations S415 and S417 of FIG. 4 will now be explained in detail.

In operations S901 and S903, if information on estimates of execution time for a plurality of execution waiting tasks of a plurality of cameras and execution request messages from the plurality of cameras are received, the core processor 301 compares an idle-time-per-second of its camera and an estimate of execution time of each of the cameras in an order of priority of the plurality of cameras, and transmits an execution-possible message or an execution-impossible message to the plurality of cameras according to a comparison result.

Here, the core processor 301 sets a higher priority to a camera having a shorter idle-time-per-second among the plurality of cameras. The priority of each of the plurality of cameras may be fixedly set by a user (Refer to FIG. 10).

In operations S905-S909, if at least one execution waiting task from a camera is received after an execution-possible message is transmitted, the core processor 301 executes the at least one received execution waiting task.

Then, in operation S911, the core processor 301 transmits a result of the execution of the at least one execution waiting task to the camera.

FIG. 10 is a diagram illustrating a case where priority of each of cameras shown in FIG. 5 is fixedly set by a user, according to an exemplary embodiment.

Referring to FIG. 10, the first camera which is provided in the lobby performs face detection, motion detection, and line-crossing detection. The second camera which is provided in the stairs performs only motion detection. The third camera which is provided in the office does not perform any image analysis. The fourth camera which is provided in the store performs tampering detection and motion detection.

Accordingly, the user may set a first priority to the first camera, a second priority to the fourth camera, a third priority to the second camera and a fourth priority to the third camera.

Figure 11:
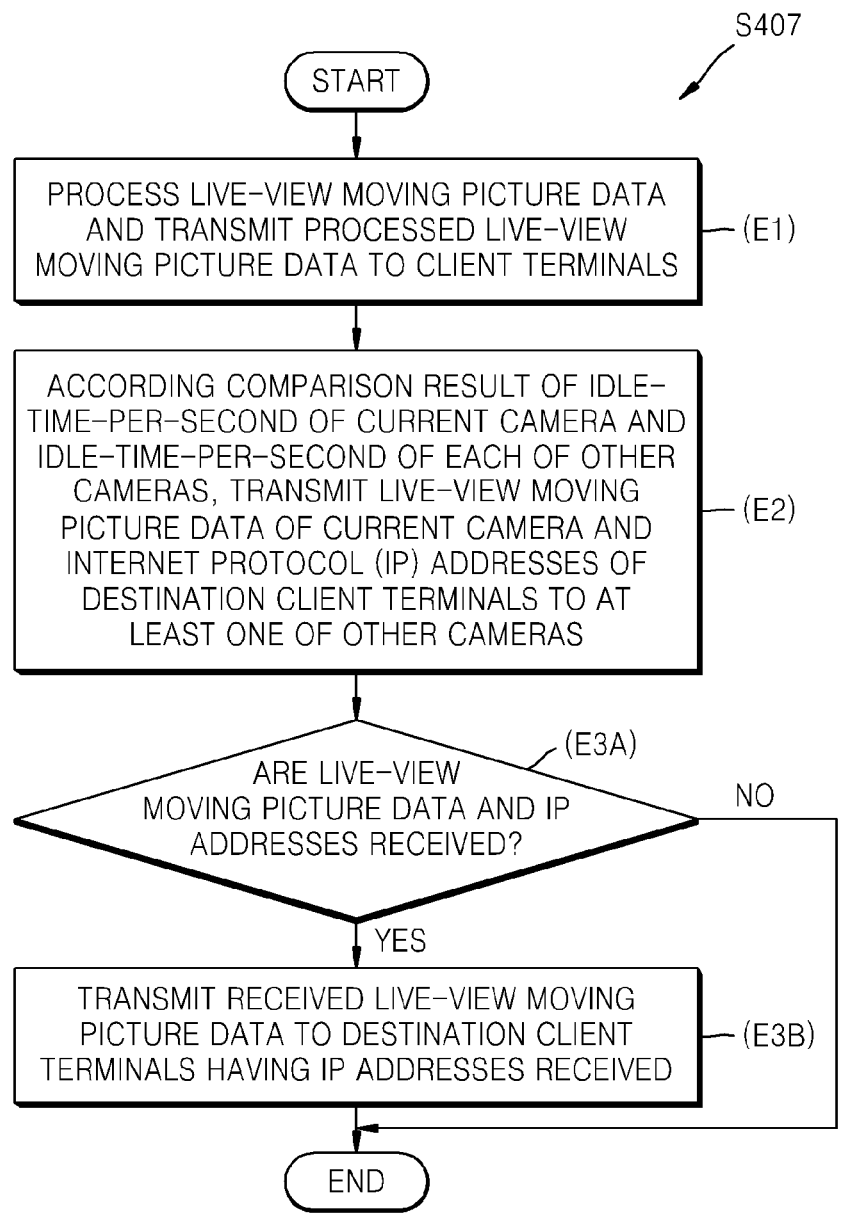
FIG. 11 is a flowchart of operation S407 shown in FIG. 4, according to an exemplary embodiment.

FIG. 11 is a flowchart of operation S407 shown in FIG. 4, according to an exemplary embodiment. Referring to FIGS. 3-5 and 11, operation S407 of FIG. 4 will now be explained in detail.

In operation E1, the core processor 301 processes live-view moving picture data and transmits a result of the processing of the live-view moving picture data to client terminals.

In operation E2, according to a comparison result of an idle-time-per-second of its camera and an idle-time-per-second of each of the other cameras, the core processor 301 transmits live-view moving picture data of its camera and Internet Protocol (IP) addresses of destination client terminals to at least one of the other cameras.

In operations E3A and E3B, if live-view moving picture data and IP addresses of destination client terminals from another camera are received, the core processor 301 transmits the received live-view moving picture data to the received IP addresses of destination client terminals.

The operations in FIG. 11 will now be explained further.

In processing the live-view moving picture data and transmitting the result of live-view moving picture data to the client terminals, relatively many destination client terminals may be connected to, for example, the first camera.

In this case, the first camera transmits the live-view moving picture data and the IP addresses of destination client terminals to, for example, the third camera, and the third camera may transmit the received live-view moving picture data to the destination client terminals having the received IP addresses. By this effective transmission, the transmission performance of the first camera may be increased.

Figure 12:
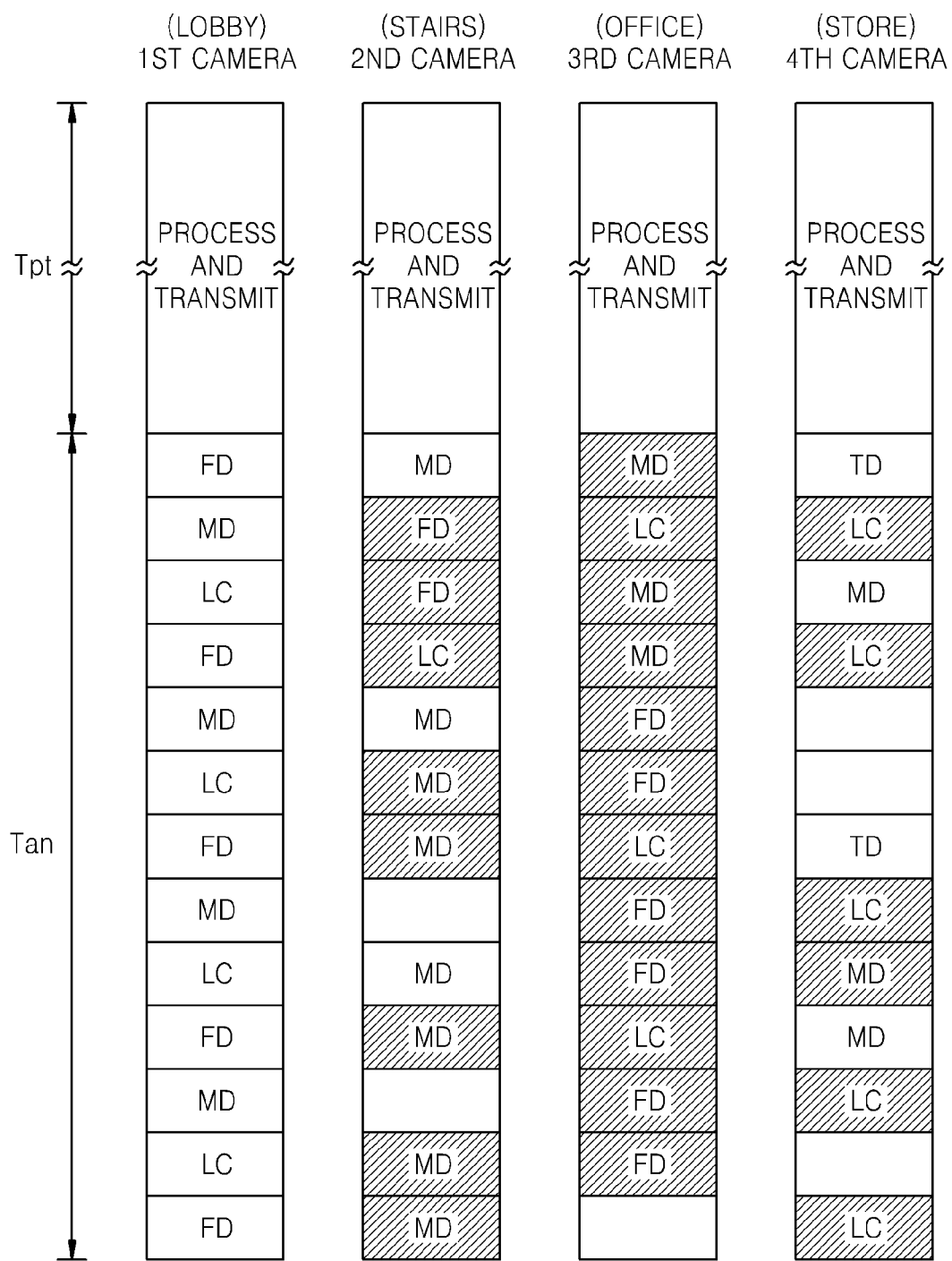
FIG. 12 is a diagram illustrating that the job queue shown in FIG. 5 is modified, according to an exemplary embodiment.

FIG. 12 is a diagram illustrating that the job queue shown in FIG. 5 is modified, according to an exemplary embodiment. In FIG. 12, a reference number identical to that of FIG. 5 denotes the same object.

Execution waiting tasks hatched in FIG. 12 belong to the first camera but are executed by the second through fourth cameras.

Referring to FIGS. 5 and 12, the first camera additionally executes 26 execution waiting tasks (hatched tasks) by using the idle-time-per-second of the second through fourth cameras.

Accordingly, the first camera which can execute maximum 13 execution waiting tasks per second may have a capability of executing maximum 39 execution waiting tasks per second.

As described above, according to the camera operation method, the camera, and the surveillance system of the exemplary embodiments, each camera receives information on idle-time-per-second information from each of other cameras, every second. Also, according to a comparison result of an idle-time-per-second of a current camera with an idle-time-per-second of each of the other cameras, at least one execution waiting task among execution waiting tasks of the current camera is executed by at least one of the other cameras, or the current camera executes at least one execution waiting task from at least one of the other cameras.

Accordingly, according to the camera operation method, the camera, and the surveillance system of the exemplary embodiments, the mutual communication function of cameras is used and thus, an efficient operation is enabled from the viewpoint of cameras as a whole. Examples of this efficient operation are as follows.

Firstly, if the other cameras execute execution waiting tasks of a current camera for the current camera, the performance of the current camera can be increased. For example, the current camera may analyze high resolution live-view moving picture data and can more accurately determine whether an event occurs.

Secondly, in processing live-view moving picture data and transmitting the processed live-view moving picture data to client terminals, there is a case when relatively many destination client terminals are connected to, for example, a first camera. In this case, the first camera may transmit live-view moving picture data and Internet Protocol (IP) addresses of destination client terminals to, for example, a third camera, and the third camera may transmit the received live-view moving picture data to the received IP addresses of the destination client terminals. By this efficient transmission, the transmission performance of the first camera may be increased.

Thirdly, as idle-time-per-second information of a current camera is transmitted to the other cameras every second and idle-time-per-second information of each of the other cameras is received by the current camera every second, each of the cameras can monitor whether a certain camera is faulty. For example, the current camera can provide data to client terminals, according to information on a camera which does not transmit data every second.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the inventive concept have been described with reference to the figures, it will be understood by those of ordinary skill in the art that various changes in form and details may be made therein without departing from the spirit and scope of the inventive concept as defined by the following claims.

What is claimed is:

1. A method of controlling a camera which is connected to at least one other camera and at least one client terminal through a communication network, the method comprising:
   controlling the camera to receive and analyze information about an idle time of each of the at least one other camera;
   according to the analyzing, controlling the camera to request the at least one other camera to execute at least one task of the camera on behalf of the camera by transmitting the at least one task of the camera and/or information about the at least one task of the camera to the at least one other camera,
   wherein the idle time of each of the at least one other camera is set to a time remaining before each of the at least one other camera is configured to execute a task among one or more tasks of each of the at least one other camera or a sum of time durations at which no tasks are allocated to each of the at least one other camera, and
   wherein the at least one task of the camera is scheduled to be executed by the camera according to a job queue of the camera.

2. The method of claim 1, wherein the camera is controlled to receive the information about the idle time of each of the at least one other camera periodically at a predetermined time interval.

3. The method of claim 1, further comprising:
   controlling the camera to transmit information about an idle time of the camera to the at least one other camera; and
   if the at least one task of the at least one other camera and/or the information about the at least one task of the at least one other camera are received, controlling the camera to execute the received at least one task at the camera,
   wherein the idle time of the camera is set to a time remaining before the camera is configured to execute a task among one or more tasks of the camera or a sum of time durations at which no tasks are allocated to the camera.

4. The method of claim 3, wherein the camera is controlled to receive the information about the idle time of each of the at least one camera periodically at an interval of a predetermined time and/or transmit the information about the idle time of the camera periodically at the interval of the predetermined time.

5. The method of claim 4, wherein the idle time of each of the at least one other camera is calculated by adding time durations for executing all tasks set to be executed within the predetermined time and subtracting a result of the addition from the predetermined time.

6. The method of claim 3, further comprising:
   controlling the camera to transmit a result of the-execution of the received at least one task to the at least one of other camera which transmitted the at least one task.

7. The method of claim 1, further comprising:
   controlling the at least one other camera to transmit a result of execution of the at least one task of the camera to the camera.

8. The method of claim 1, further comprising controlling the camera to determine if an idle time of the camera exists,
   wherein if it is determined that the idle time of the camera does not exist, the camera is controlled to transmit the at least one task of the camera to the at least one other camera.

9. The method of claim 8, wherein if it is determined that the idle time of the camera does not exist, the camera is further controlled to:
   obtain an estimate of an execution time required for executing the at least one task of the camera to be transmitted;
   transmit information on the estimate of the execution time and an execution request message to a camera having a longest idle time among the at least one other camera;
   if an execution-possible message from the camera having the longest idle time is received, transmit the at least one task of the camera to be transmitted to the camera having the longest idle time;
   if an execution-impossible message from the camera having the longest idle time is received, transmit the information on the estimate of the execution time and the execution request message to a camera having a second longest idle time; and
   if an execution-possible message from the camera having the second longest idle time is received, transmit the at least one task of the camera to be transmitted to the camera having the second longest idle time.

10. The method of claim 3, further comprising:
    if information on an estimate of an execution time required for executing the at least one task of the at least one other camera and an execution request message for executing the at least one task of the at least one other camera are received, controlling the camera to transmit an execution-possible message or an execution-impossible message to the at least one other camera according to a result of comparing an idle time of the camera and the estimate of the execution time, before the at least one task of the at least one other camera and/or the information about the at least one task of the at least one other camera are received at the camera; and
    transmitting a result of execution of the received at least one task to the at least one other camera.

11. The method of claim 10, wherein the camera is controlled to transmit the execution-possible message or the execution-impossible message to the at least one other camera based on priorities of the at least one other camera.

12. The method of claim 11, wherein a higher priority is set to a camera having a shorter idle time among the at least one other camera.

13. The method of claim 11, wherein the priority of the at least one other camera is set by a user.

14. The method of claim 1, wherein the at least one task of the camera comprises transmitting a result of processing image data captured by the camera to the at least one client terminal,
- wherein the information about the at least one task of the camera comprises an address of the at least one client terminal,
- wherein the at least one other camera is controlled to transmit the result of the processing the image data captured by the camera to the address of the at least one client terminal.

15. The method of claim 3, wherein the at least one task of the at least one other camera comprises transmitting a result of processing image data captured by the at least one other camera to the at least one client terminal,
- wherein the information about the at least one task of the at least one other camera comprises an address of the at least one client terminal,
- wherein the camera is controlled to transmit the result of the processing the image data captured by the at least one other camera to the address of the at least one client terminal.

16. A camera configured to be connected to at least one other camera and at least one client terminal through a communication network, the camera comprising:
- an optical system configured to capture image data; and
- a communication port configured to receive information about an idle time of each of the at least one other camera; and
- a controller configured to analyze the information about the idle time of each of the at least one other camera, and request the at least one other camera to execute at least one task of the camera on behalf of the camera by transmitting the at least one task of the camera and/or information about the at least one task of the camera to the at least one other camera through the communication port,
- wherein the idle time of each of the at least one other camera is set to a time remaining before each of the at least one other camera is configured to execute a task among one or more tasks of each of the at least one other camera or a sum of time durations at which no tasks are allocated to each of the at least one other camera, and
- wherein the at least one task of the camera is scheduled to be executed by the camera according to a job queue of the camera.

17. The camera of claim 16, wherein the camera is further configured to receive the information about the idle time of each of the at least one other camera periodically at a predetermined time interval.

18. The camera of claim 16, wherein the controller is further configured to transmit information about an idle time of the camera to the at least one other camera, and, if at least one task of the at least one other camera and/or information about the at least one task of the at least one other camera are received, execute the received at least one task of the at least one other camera at the camera.

19. The camera of claim 18, the controller is further configured to receive the information about the idle time of each of the at least one other camera periodically at an interval of a predetermined time and/or transmit the information about the idle time of the camera periodically at the interval of the predetermined time.

20. A surveillance system comprising:
- a plurality of cameras connected to one another; and a plurality of client terminals connected to the plurality of cameras through a communication network,
- wherein each of the plurality of cameras is configured to transmit an idle time of the camera to the other cameras,
- wherein each of the plurality of cameras is configured to receive and analyze information about an idle time of each of the other cameras,
- wherein, according to the analyzing, each camera of the plurality of cameras is configured to request at least one other camera to execute at least one task of the each camera on behalf of the each camera by transmitting the at least one task of the each camera to the at least one other cameras,
- wherein the each camera is configured to, if at least one task of the at least one other camera is received, execute the received at least one task of the at least one other camera, and
- wherein the at least one task of the camera is scheduled to be executed by the camera according to a job queue of the camera.

21. The method of claim 1, wherein the at least one task of the camera comprises at least one of a face detection task, a motion detection task, a line-crossing task, and a tampering detection task.

22. A method of controlling a camera which is connected to at least one other camera and at least one client terminal through a communication network, the method comprising:
- controlling the camera to receive and analyze information about an idle time of each of the at least one other camera, wherein the idle time is a time during which an individual one of the at least one other camera is idle during an analysis cycle, the analysis cycle being a periodically performed interval during which moving picture data is analyzed to determine if an event occurs;
- according to the analyzing, controlling the camera to request the at least one other camera to execute at least one task of the camera on behalf of the camera by transmitting the at least one task of the camera and/or information about the at least one task of the camera to the at least one other camera, wherein the at least one task of the camera is scheduled to be executed by the camera according to a job queue of the camera, and the at least one task is a portion of the total tasks performed by the camera during the analysis cycle.

* * * * *